(12) United States Patent
Shaikh et al.

(10) Patent No.: US 12,400,063 B1
(45) Date of Patent: Aug. 26, 2025

(54) PHYSICALLY AWARE DESIGN OF INTERCONNECT FABRIC

(71) Applicant: Amazon Technologies, Inc., Seattle, WA (US)

(72) Inventors: Sharukh Shahajahan Shaikh, San Jose, CA (US); Fnu Arun Kumar, Palo Alto, CA (US); Kun Xu, Austin, TX (US)

(73) Assignee: Amazon Technologies, Inc., Seattle, WA (US)

( * ) Notice: Subject to any disclaimer, the term of this patent is extended or adjusted under 35 U.S.C. 154(b) by 355 days.

(21) Appl. No.: 18/064,574

(22) Filed: Dec. 12, 2022

(51) Int. Cl.
*G06F 30/392* (2020.01)
*H01L 23/538* (2006.01)
*H01L 25/065* (2023.01)

(52) U.S. Cl.
CPC ........ *G06F 30/392* (2020.01); *H01L 23/5382* (2013.01); *H01L 23/5386* (2013.01); *H01L 25/0655* (2013.01)

(58) Field of Classification Search
CPC ............. H01L 23/5382; H01L 23/5386; H01L 25/0655; G06F 30/392
See application file for complete search history.

(56) References Cited

U.S. PATENT DOCUMENTS

| | | | |
|---|---|---|---|
| 7,550,994 B1 * | 6/2009 | Camarota | G11C 7/20 326/38 |
| 9,437,260 B2 * | 9/2016 | Prenat | G11C 7/1045 |
| 10,909,292 B1 * | 2/2021 | Maidee | G06F 30/396 |
| 2015/0008957 A1 * | 1/2015 | Olgiati | G06F 11/079 326/38 |
| 2019/0238134 A1 * | 8/2019 | Lee | H01L 23/5389 |
| 2019/0253056 A1 * | 8/2019 | Lin | H01L 23/5382 |

\* cited by examiner

*Primary Examiner* — Omar F Mojaddedi
(74) *Attorney, Agent, or Firm* — Weaver Austin Villeneuve & Sampson LLP

(57) ABSTRACT

An interconnect fabric in an integrated circuit (IC) device can be hierarchically partitioned into a set of peripheral sub-fabrics and a glue sub-fabric coupled to each of the peripheral sub-fabrics based on the physical design information associated with the IC device. Each of the peripheral sub-fabrics and the glue sub-fabric can be implemented using 2:1 hierarchical multiplexers based on an agglomerative clustering scheme. Physically aware design of the hierarchical multiplexer tree along with the optimal placement of the 2:1 multiplexers can provide smaller overall wire length and reduced routing congestion in the interconnect.

22 Claims, 13 Drawing Sheets

FIG. 7A (700A)

| M0 | S0 | C1_S1_S | C1_S2_S | C1_S4_S |
|---|---|---|---|---|
| M0 | 1 | 1 | 0 | 0 |
| M1 | 0 | 1 | 1 | 0 |
| C1_S0_M | 1 | 0 | 0 | 0 |

FIG. 7B (700B)

|  | S1 | C2_S2_S | C2_S3_S | C2_S4_S |
|---|---|---|---|---|
| M2 | 0 | 1 | 0 | 0 |
| M3 | 1 | 0 | 1 | 0 |
| C2_S1_M | 1 | 1 | 1 | 0 |

FIG. 7C (700C)

|  | S2 | S3 | S4 |
|---|---|---|---|
| C3_S2_M | 1 | 0 | 0 |
| C3_S3_M | 0 | 1 | 0 |
| C3_S4_M | 0 | 0 | 1 |

FIG. 7D (700D)

| M4 | C1_S0_M | C2_S1_M | C3_S2_M | C3_S3_M | C3_S4_M |
|---|---|---|---|---|---|
| C1_S1_S | 1 | 1 | 1 | 0 | 1 |
| C1_S2_S | 0 | 1 | 0 | 0 | 0 |
| C1_S4_S | 0 | 0 | 1 | 0 | 0 |
| C2_S2_S | 1 | 0 | 0 | 0 | 1 |
| C2_S3_S | 0 | 0 | 1 | 1 | 0 |
| C2_S4_S | 0 | 0 | 0 | 0 | 1 |

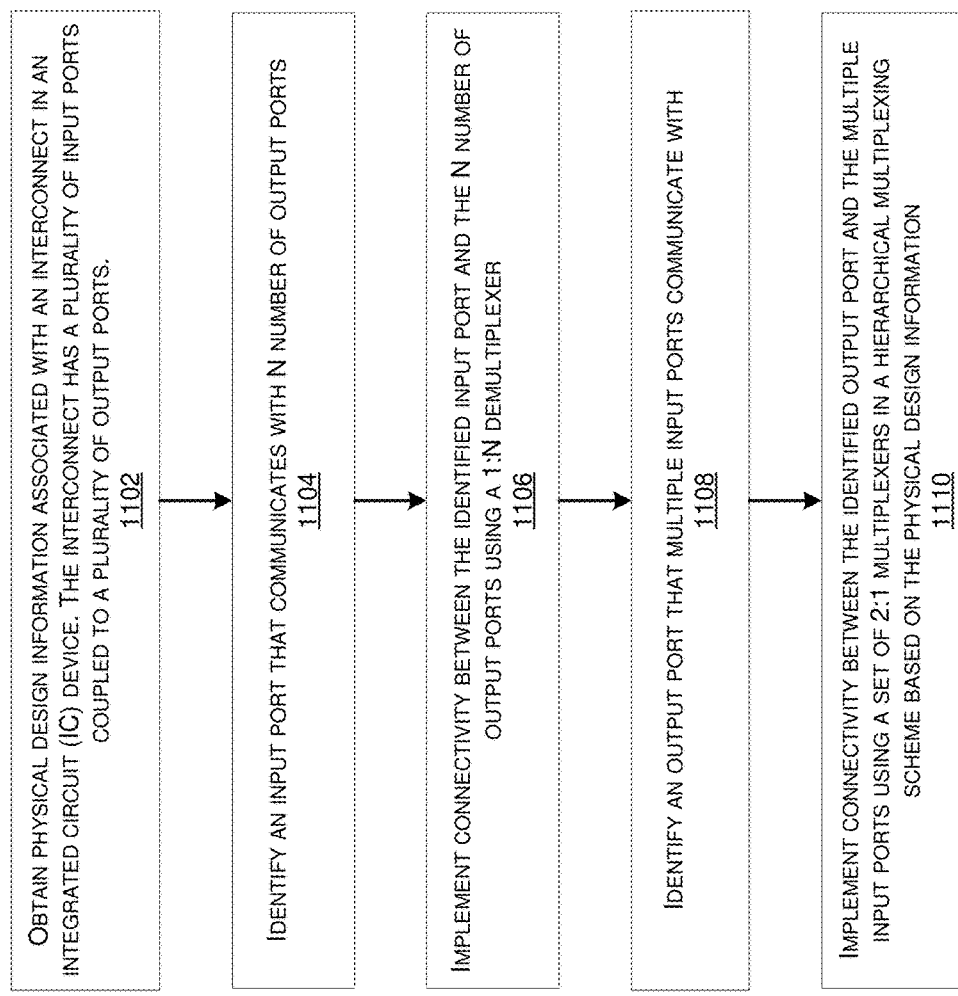

PHYSICALLY AWARE DESIGN OF INTERCONNECT FABRIC

BACKGROUND

A System-on-a-Chip (SoC) may include an interconnect fabric to connect a plurality of on-chip components of an SoC. The plurality of on-chip components may include memory devices, processors, accelerators, direct memory access (DMA) engines, physical layer (PHY) devices, or input/output (I/O) device, that may operate as initiators and/or targets to exchange data with one another via the interconnect fabric. The interconnect fabric may include multiplexers, demultiplexers, registers, and other suitable fabric components to facilitate data transfer between various initiators and targets.

BRIEF DESCRIPTION OF THE DRAWINGS

Various embodiments in accordance with the present disclosure will be described with reference to the drawings, in which:

FIG. 7A shows a connectivity matrix for a first peripheral sub-fabric, according to some embodiments;

FIG. 7B shows a connectivity matrix for a second peripheral sub-fabric, according to some embodiments;

FIG. 7C shows a connectivity matrix for a third peripheral sub-fabric, according to some embodiments;

FIG. 7D shows a connectivity matrix for a glue sub-fabric, according to some embodiments;

FIG. 11 shows an example flowchart for a method that can be executed to implement an interconnect in an IC device using physical design information, according to some embodiments.

DETAILED DESCRIPTION

Figure 1:
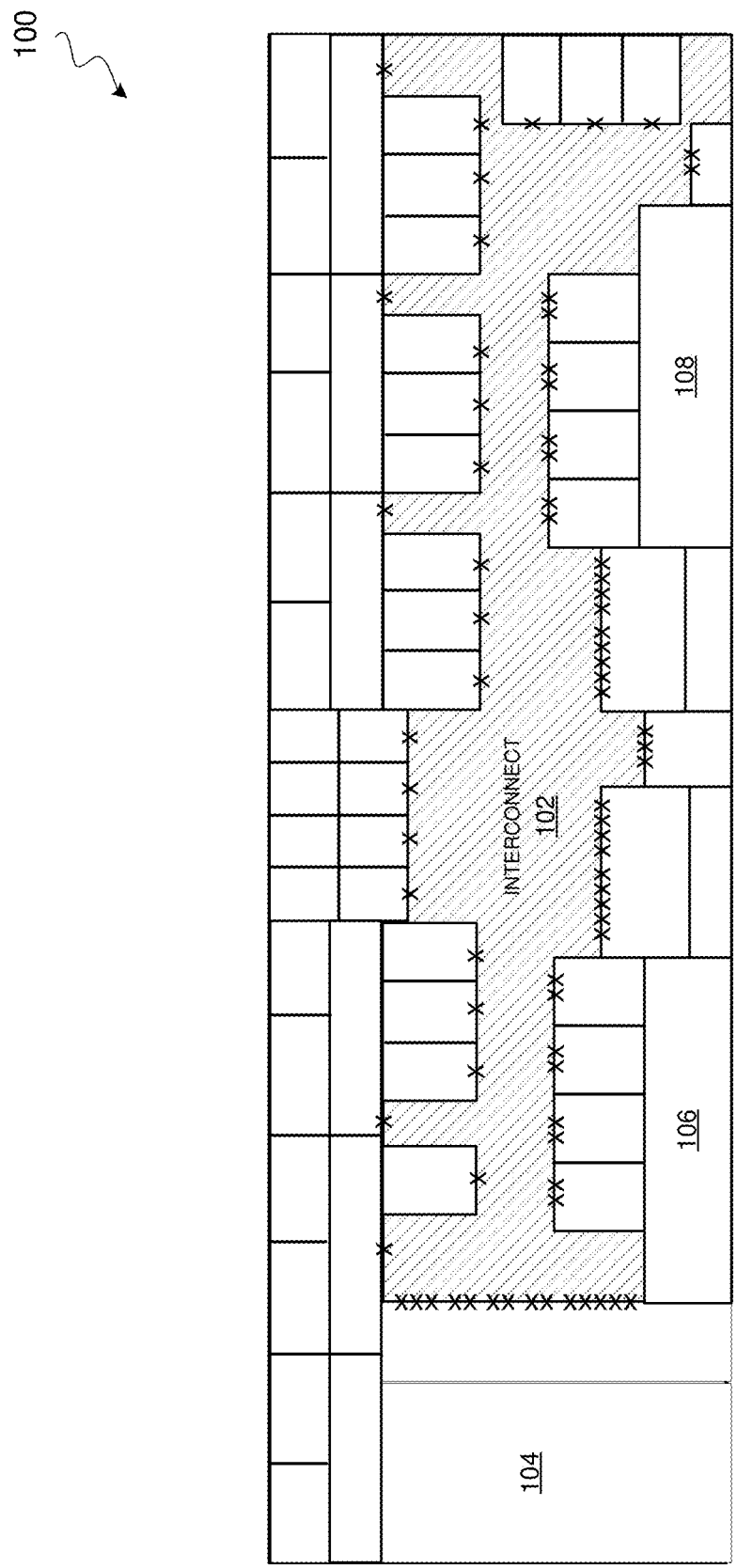
FIG. 1 illustrates an example floorplan for an integrated circuit (IC) device.

A system-on-a-chip (SoC) may include a plurality of on-chip components on one or more dies to provide high performance and computing power demanded by modern-day applications. The plurality of on-chip components may include memory devices, processors, accelerators, DMA engines, PHY devices, or I/O device that may operate as initiators and/or targets to exchange data with one another via an interconnect fabric using corresponding communication ports. The communication ports may include initiator ports that can be input ports to the interconnect fabric, and target ports that can be output ports of the interconnect fabric. The communication between the on-chip components can be performed using any suitable bus protocol, e.g., Advanced eXtensible Interface (AXI), AXI Coherency Extensions (ACE), or Coherent Hub Interface (CHI), among other examples.

In most cases, an initiator can communicate with multiple targets, or multiple initiators can communicate with the same target. Some systems may utilize a sparsely connected interconnect fabric for data transfer between a large number of initiators and targets to achieve high performance using point-to-point connection between each initiator and a corresponding target. The interconnect fabric may include multiple fabric components to facilitate the data transfer between various initiators and targets using point-to-point connections. For example, the interconnect fabric may include a demultiplexer (demux) to provide connectivity between an input port and multiple output ports, and a multiplexer (mux) to provide connectivity between multiple input ports and an output port.

In some implementations, each mux may append an identifier (ID) bit to each signal that goes through that mux that can be used to back track that signal to its source. An ID compressor can be used to compress the ID bits to a width that is suitable for the corresponding target. The interconnect fabric may also include registers to provide timing slices to traverse the on-chip distance between the input ports and the output ports, and to spread out fabric components to reduce congestion. For an IC device with a large number of initiators and targets coupled to a sparsely connected interconnect fabric, a number of fabric components may be used to facilitate the data transfer between the large number of initiators and targets using point-to-point connections.

Generally, the cell count for a large design can be enormous which can make the physical design (PD) of the SoC challenging, and can result in congestion overflow due to a large number of wires connecting different components of the SoC. In some cases, an initial floorplan of various on-chip components of the SoC (e.g., hard macros and standard cells) can be provided for timing and routability, and PD information comprising the placement information of the on-chip components can be generated. The PD information may also include area information to implement the interconnect fabric. Generally, the interconnect fabric has to fit in the left-over floorplan space available in the chip area not occupied by the SoC components, which may include various notches and narrow channels. Thus, the placement of various fabric components of the SoC interconnect may not be uniform, which can add to the placement and routing challenges. Additionally, when the interconnect fabric includes multiple large multiplexers that receive communication from different input ports, the routing congestion can be further exacerbated.

Generally, design of the interconnect fabric can be a crucial factor for the performance and value of a SoC design with a large number of components on a large die with shrinking process node. Industry standard tools may not be capable of building large interconnect fabrics because of the dependency on the back-end design, given the PD challenges, such as, routing congestion, large cell count, timing closure, etc. Thus, the chip design may suffer from interconnect complexity, which can prolong the design cycle and delay tapeout of the SoC.

The techniques described herein can be used to reduce routing congestion by implementing the interconnect fabric (or simply the "interconnect") based on the PD information associated with the interconnect. The PD information comprising location information for each of the plurality of input ports and the plurality of output ports of the interconnect can be obtained from an initial floorplan of the SoC. The floorplan information may include placement information of various on-chip components of the SoC and an area to implement the interconnect fabric to provide connectivity between the initiator ports and the target ports of the on-chip components of the SoC based on the system specification. The PD information can be used to partition the interconnect fabric into smaller peripheral sub-fabrics and a glue sub-fabric which facilitates connections between various peripheral sub-fabrics. For example, the initiators and/or the targets that are physically close in the floorplan can be grouped in the same sub-fabric such that the cell count in each sub-fabric does not exceed a threshold cell count. The glue sub-fabric can include remaining initiators/targets that are not included in any of the peripheral sub-fabrics. If the glue sub-fabric or a peripheral sub-fabric is too big, it can further be hierarchically split into smaller secondary peripheral sub-fabrics and a secondary glue sub-fabric. In various examples, the partitioning can be performed by the chip designer, or can be automated. Partitioning can help reduce the synthesized cell count for each sub-fabric that is manageable by the backend tools to perform the PD runs in a shorter time.

For each sub-fabric, connectivity between each input port that communicates with multiple output ports can be implemented using demultiplexers (demuxes). Additionally, connectivity between each output port that receives communication from multiple input ports can be implemented using a set of 2:1 multiplexers (muxes) based on a hierarchical multiplexing scheme. As an example, a hierarchical multiplexing scheme may use agglomerative clustering based on a distance similarity metric of the multiple input ports to determine which two inputs are provided to each 2:1 mux in the set of 2:1 muxes. The distance similarity metric can be a Manhattan distance since the PD is generally performed using horizontal and vertical wires.

As an example, the initiator ports that are physically close to each other in the floor plan and are communicating with the same or similar target port can be muxed together in a first level of hierarchical muxing. The number of wires going to the respective target port in each level of hierarchy can be reduced using hierarchical multiplexing. This reduces the congestion since the number of wires and routing resources may get smaller with each level of muxing. Thus, the interconnect design based on the PD information associated with the on-chip components and their ports can be used to reduce the routing congestion when applying a hierarchical multiplexing scheme. Since each 2:1 mux may only append a single ID bit, a single ID compressor can be used at the end of the last hierarchical 2:1 mux instead of having an ID compressor for each of the 2:1 muxes in the mux tree, which can also help reduce the routing congestion.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiments being described.

FIG. 1 illustrates an example floorplan 100 for an integrated circuit (IC) device. The IC device can be an SoC comprising a plurality of on-chip components, which may be implemented using a combination of Intellectual Property (IP) blocks, hard macros, standard cells, or custom cells, among other examples.

The on-chip components of the SoC may include memory devices, processors, accelerators, DMA engines, PHY devices, I/O devices, etc., which may operate as initiators or targets at different times of operation. An initiator may send a transaction to a target, and the target may receive the transaction from the initiator. The transaction may include data or control signals. The initiators and the targets may communicate via an interconnect 102 using any suitable bus protocol, e.g., AXI, CHI, ACE, etc. As an example, the communication based on the AXI protocol can use five channels for write address, write data, write response, read address, and read data, with each channel comprising several signals.

The floorplan 100 in FIG. 1 illustrates example placements for some of the on-chip components of the IC device that are coupled to the interconnect 102. For example, the interconnect 102 may be coupled to a memory 104, a processor 106, and an accelerator 108, among other components that are not shown in FIG. 1 for ease of illustration. The interconnect 102 may include a plurality of ports (represented using "x" in FIG. 1) to provide connectivity between various communication ports of the on-chip components. The plurality of ports may include input ports and output ports which may be used to facilitate communication between various communication ports of the on-chip components comprising initiator ports and target ports.

In some cases, an initial place and route of the IC device can be performed to determine timing and routability of different on-chip components of the IC device, and floorplan information can be generated that includes placement information of the on-chip components and an area to implement the interconnect fabric 102. As shown in FIG. 1, the example shaded area allocated to implement the interconnect 102 may not be uniform and may include notches and narrow channels based on the placement of the on-chip components surrounding the interconnect 102. Thus, the interconnect 102 may have to be implemented to fit in the left-over floorplan space available around or between the on-chip components, which can make the routing challenging. Some systems may include a sparsely connected interconnect, and point-to-point connections between each initiator and corresponding target can be used to achieve high performance. This is further described with reference to FIG. 2.

Figure 2:
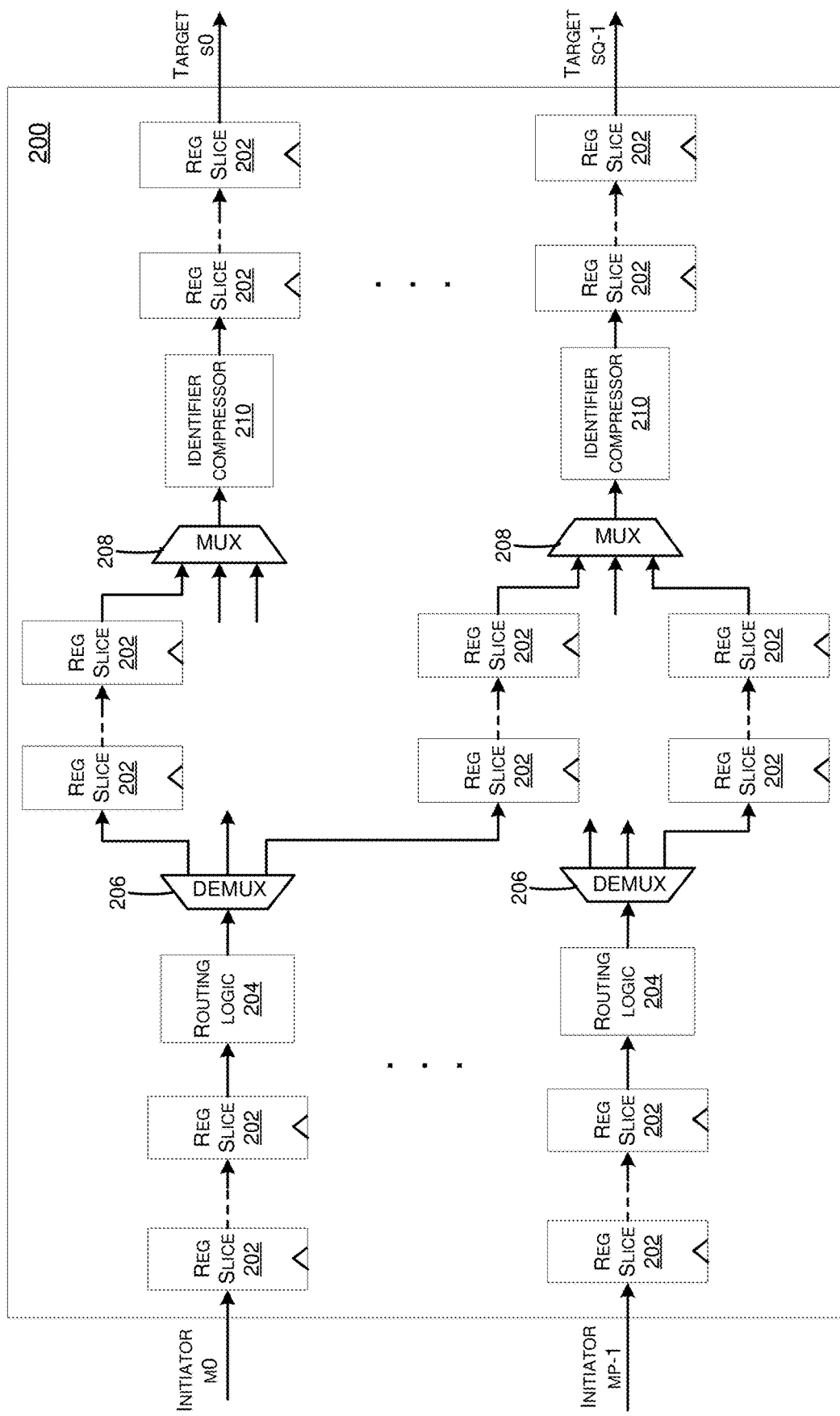
FIG. 2 illustrates an example interconnect comprising a plurality of fabric components to facilitate data transfer between communication ports of various on-chip components of the IC device, according to some embodiments.

FIG. 2 illustrates an example interconnect 200 comprising a plurality of fabric components to facilitate data transfer between communication ports of various on-chip components of an IC device, according to some embodiments. The IC device can be an SoC as described with reference to FIG. 1. The communication ports may include a plurality of initiator ports and target ports associated with the various on-chip components that may operate as initiators or targets at different times of operation. In this specification, the terms "initiator ports" and "initiators" can be used interchangeably, and "target ports" and "targets" can be used interchangeably.

In some implementations, the interconnect 200 can be a sparsely connected interconnect, and point-to-point connections between each initiator and corresponding target can be used to achieve high performance. The interconnect 200 may communicate with p number of initiators $m_0, \ldots, m_{p-1}$ via respective p input ports. The interconnect 200 may also communicate with q number of targets $s_0, \ldots, s_{q-1}$ via respective q output ports. Each of the p input ports may be associated with a respective routing logic 204 and a demux 206. Each of the q output ports may be associated with a respective mux 208 and an identifier compressor (IDC) 210. The interconnect 200 may also include a plurality of register (reg) slices 202 between each input port and output port to provide timing slices to traverse the on-chip distance between the input port and output port, and to spread out various fabric components to reduce congestion.

The routing logic 204 may include circuitry to keep track of all the transactions that are directed to different targets via the corresponding demux 206. For example, when the data transfer through the interconnect 200 is performed using 5 different channels based on the AXI protocol, the routing logic 204 can be used to store the information associated with the transactions arriving at the demux 206 to maintain correct ordering of the transactions forwarded to different targets in order to avoid deadlocks due to cyclic dependency issues between various channels. In some implementations, the demux 206 and the routing logic 204 can be designed as a hard macro, which can be instantiated for each of the p input ports.

Figure 3:
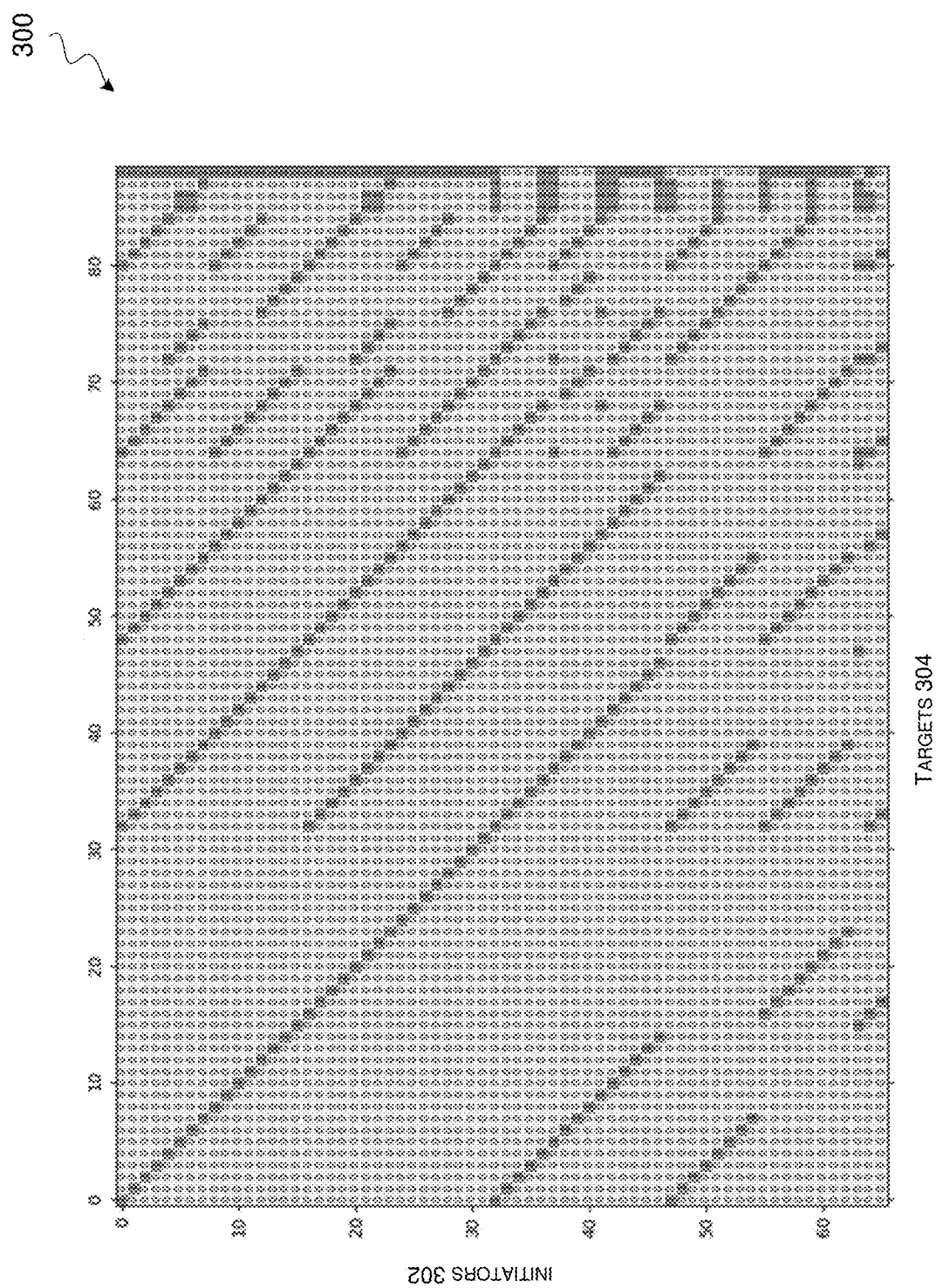
FIG. 3 illustrates an example fabric connectivity matrix between a large number of initiators and targets that are coupled through a sparsely connected interconnect.

In some implementations that use AXI based interconnect, each mux 208 may append an identifier (ID) bit to each signal that goes through the mux to map the transaction to the initiator port or prior mux. When a large number of signals are merged through a mux, the number of ID bits may increase. The IDC 210 can be used after the mux 208 to map a higher number of ID bits to a smaller number of ID bits with an ID width that is compatible with the FIG. 3 illustrates an example fabric connectivity matrix 300 between a large number of initiators 302 and targets 304 that are coupled through a sparsely connected interconnect. In some implementations, the initiators 302 and the targets 304 may communicate using AXI bus protocol.

The example of FIG. 3 shows the fabric connectivity matrix 300 between 66 initiators and 89 targets. As shown in FIG. 3, connectivity between an initiator in the set of initiators 302 and a target in the set of targets 304 is indicated by a "1" (shown in shaded cells) in the fabric connectivity matrix 300. A "0" in the fabric connectivity matrix 300 indicates that there is no connection between the initiator and the target (e.g., the initiators does not communicate with the target). A sparsely connected interconnect can have a connectivity matrix that contains, for example, 50% or more of the cells with a "0" indicating that at least half of the possible combinations of initiator and target need not be connected. For example, the fabric connectivity matrix 300 representing a sparsely connected interconnect in FIG. 3 includes a much higher number of 0s than 1s. In most cases, multiple initiators may communicate with a single target, and a single initiator may communicate with multiple targets. For example, an initiator 0, an initiator 22, and an initiator 47 can communicate with a target 0. Similarly, the initiator 0 can communicate with multiple targets, e.g., a target 17, a target 23, target 57, a target 65, a target 73, and a target 81.

When there are a large number of initiators and targets coupled to an interconnect fabric, a higher number of fabric components (e.g., reg slices 202) may be used to facilitate the data transfer between the large number of initiators and targets using point-to-point connections. Furthermore, bigger sizes of demux and mux circuits may be needed to support connectivity between a large number of initiators and targets. As an example, the fabric components in an interconnect coupled to 66 initiators and 89 targets shown in FIG. 3 may include an average mux size of 5×1 and an average de-mux size of 1×7. For example, as shown in FIG. 3, a target 80 may communicate with an initiator 0, an initiator 8, an initiator 16, an initiator 24, an initiator 22, an initiator 37, an initiator 47, an initiator 55, an initiator 63, and an initiator 64, and therefore a 10×1 mux may be required to connect each of those initiators with the target 80.

Furthermore, when there are multiple initiators that communicate with the same target, a large number of wires may be traversing to a corresponding mux to reach that target. In most cases, routing may become complex for a point-to-point interconnect with the large number of initiators and targets, which may result in a congestion overflow to support the connectivity between different sets of initiators with corresponding targets. Additionally, with the non-uniform floorplan space available for implementing the interconnect, the placement and routing of the interconnect fabric components can become complex and challenging, which may increase the PD time for the SoC to achieve the desired timing and performance.

The techniques described herein can be used to reduce routing congestion by implementing the interconnect based on the physical design information associated with the interconnect. The floorplan information of the IC device can be obtained which may include placement information of the on-chip components of the IC device and an area to implement the interconnect. In some embodiments, the interconnect fabric can be hierarchically split into multiple sub-fabrics to distribute the total cell count among the sub-fabrics that is manageable by the backend tools. The partitioning can keep the demuxes intact, but build the larger muxes with hierarchical 2:1 muxes. The initiators and targets that are in spatial proximity can be grouped in the same sub-fabric to reduce the number of wires traversing through the interconnect, and thus, simplifying the routing logic.

In some embodiments, the interconnect fabric can be split into smaller peripheral sub-fabrics based on the PD information, and a glue sub-fabric which facilitates connections between various peripheral sub-fabrics. For example, an interconnect fabric C may be coupled to p number of initiators $M=\{m_0, m_1, \ldots, m_{p-1}\}$ and q number of targets $S=\{s_0, s_1, \ldots, s_{q-1}\}$, where p and q may also represent the number of demux and ID compressors, respectively, in the interconnect fabric C. Hence, the sets M and S may also be used to represent demux and ID compressors. The interconnect fabric C can be partitioned by forming r number of peripheral sub-fabrics $c_1, c_2, \ldots, c_r$ such that each sub-fabric encompasses the subset of demux and ID compressors which are spatially close in the floorplan. Furthermore, the cell count for each sub-fabric may be limited by the backend flow, e.g., none of the sub-fabrics may include more than a certain number of demuxes, ID compressors, or a combination of both, based on the implementation of the average demux size and the ID compressor. In some cases, few initiators are feedthrough in other sub-fabrics to reach the partition with their associated demux since they may communicate with the same targets as the other initiators in the same partition.

The sub-fabric $c_n$ may have initiators $M_{c_n} = \{\{m_x\}, \{c_{n\_s_y\_m}\}\}$ and targets $S_{c_n} = \{\{s_w\}, \{c_{n\_s_z\_s}\}\}$, where set $\{m_x\} \subset M$ and $\{s_w\} \subset S$. The additional initiator set $\{c_{n\_s_y\_m}\}$ may connect the initiators of M not in $\{m_x\}$ with targets {$s_w$}, hence, |{$c_n\_s_y\_m$}|==|{$s_w$}|. Similarly, the additional targets {$c_n\_s_z\_s$} may connect initiators {$m_x$} to targets of S not in $c_n$.

The glue matrix sub-fabric gm may have the rest of the initiators and targets which cannot be grouped into the peripheral sub-fabrics. As gm sub-fabric may abut the peripheral sub-fabrics $c_n$, the additional initiators {$c_n\_s_y\_m$} and targets {$c_n\_s_z\_s$} for n=1,2, ..., r may respectively form its targets $S_{gm}$ and initiators $M_{gm}$. This is further explained with a smaller number of initiators and targets with reference to FIGS. 4, 5, and 6.

Figure 4:
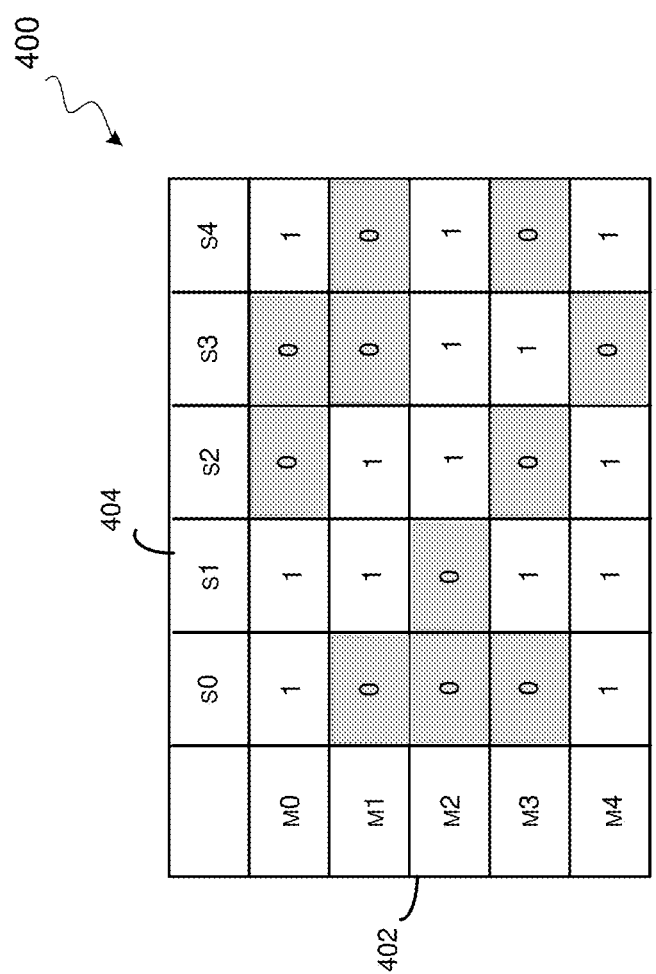
FIG. 4 shows a connectivity matrix between a set of initiators and a set of targets.

FIG. 4 shows an example of a connectivity matrix 400 for an interconnect coupled to initiators $m_0$-$m_4$ and targets $s_0$-$s_4$. Although connectivity matrix 400 is shown as having only five initiators and five targets for ease of explanation, the techniques explained with reference to connectivity matrix 400 can be applied to connectivity matrices having a much larger number of initiators and/or targets such as the connectivity matrix 300. The initiators $m_0$-$m_4$ are shown on a y-axis 402, and the targets $s_0$-$s_4$ are shown on an x-axis 404 of the connectivity matrix 400. For example, the interconnect can be an example of the interconnect 200 with both p and q equal to 5, and is described with reference to FIG. 5. The connectivity between an initiator and a target is indicated by a "1" in the connectivity matrix 400. For example, the initiator $m_0$ is connected to the targets $s_0$, $s_1$, and $s_4$, the initiator $m_1$ is connected to the targets $s_1$, and $s_2$, the initiator $m_2$ is connected to the targets $s_2$, $s_3$, and $s_4$, the initiator $m_3$ is connected to the targets $s_1$, and $s_3$, and the initiator $m_4$ is connected to the targets $s_0$, $s_1$, $s_2$, and $s_4$.

Figure 5:
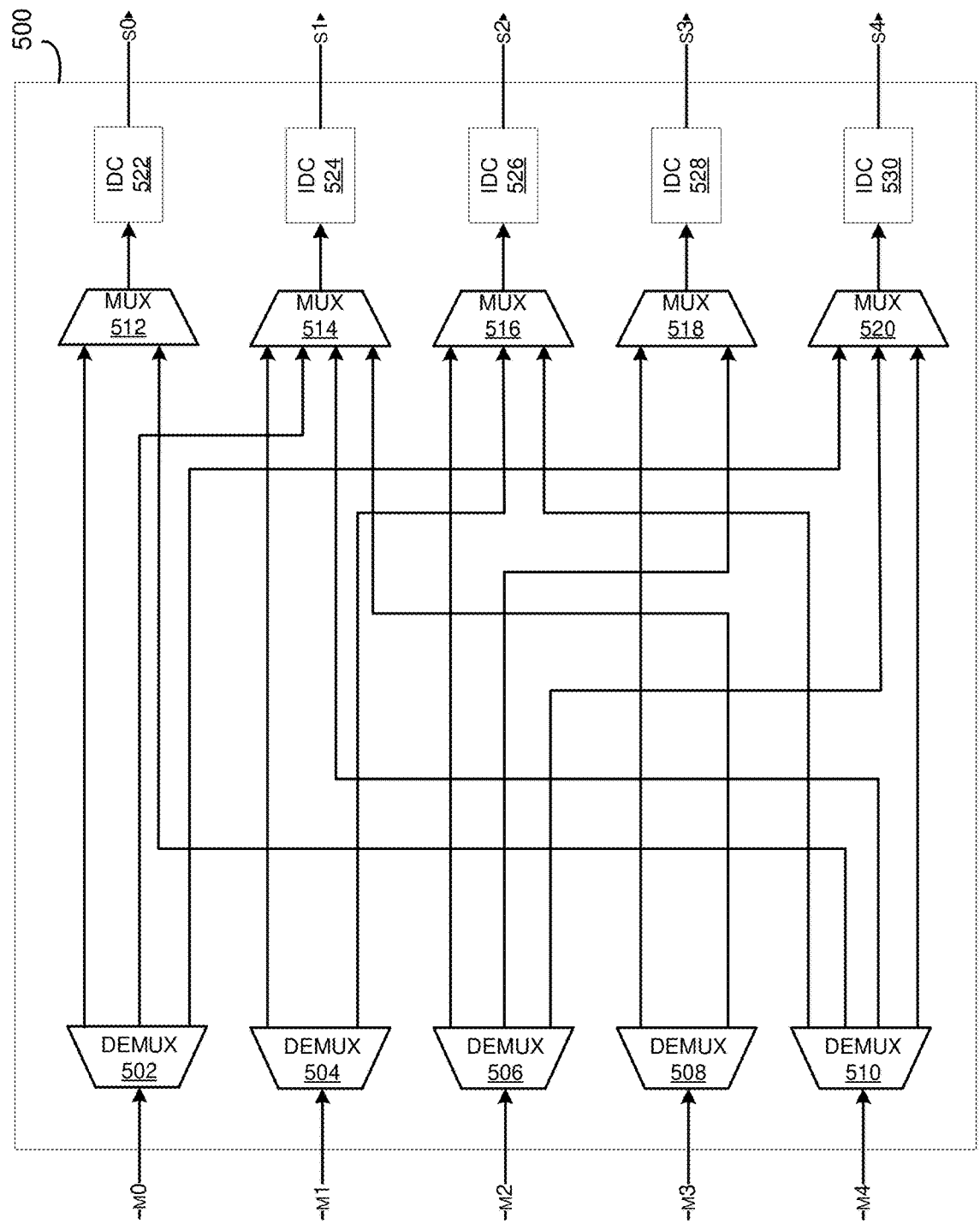
FIG. 5 shows an example interconnect that can be used to provide connectivity between the set of initiators and the set of targets, according to some embodiments.

FIG. 5 shows an example interconnect 500 that can be used to provide connectivity between a set of initiators and targets as shown by the connectivity matrix 400, according to some embodiments. The interconnect 500 may include other fabric components (e.g., reg slices 202 and routing logic 204), which are not shown here for ease of illustration.

The interconnect 500 may communicate with initiators $m_0$, $m_1$, $m_2$, $m_3$, and $m_4$ via respective input ports, and with targets $s_0$, $s_1$, $s_2$, $s_3$, and $s_4$ via respective output ports. As shown in FIG. 5, the initiator $m_0$ may be configured to communicate with the targets $s_0$, $s_1$, and $s_4$ via a 1:3 demux 502, the initiator $m_1$ may be configured to communicate with the targets $s_1$, and $s_2$ via a 1:2 demux 504, the initiator $m_2$ may be configured to communicate with the targets $s_2$, $s_3$, and $s_4$ via a 1:3 demux 506, the initiator $m_3$ may be configured to communicate with the targets $s_1$, and $s_3$ via a 1:2 demux 508, and the initiator $m_4$ may be configured to communicate with the targets $s_0$, $s_1$, $s_2$, and $s_4$ via a 1:4 demux 510.

Furthermore, the target $s_0$ may be configured to receive communication from the initiators $m_0$ and $m_4$ via a 2:1 mux 512 and an IDC 522, the target $s_1$ may be configured to receive communication from the initiators $m_0$, $m_1$, $m_3$ and $m_4$ via a 4:1 mux 514 and an IDC 524, the target $s_2$ may be configured to receive communication from the initiators $m_1$, $m_2$ and $m_4$ via a 3:1 mux 516 and an IDC 526, the target $s_3$ may be configured to receive communication from the initiators $m_2$ and $m_3$ via a 2:1 mux 518 and an IDC 528, and the target $s_4$ may be configured to receive communication from the initiators $m_0$, $m_2$ and $m_4$ via a 3:1 mux 520 and an IDC 530. The IDC 522, IDC 524, IDC 526, IDC 528, and the IDC 530 may be examples of the IDC 210.

Some embodiments can be used to reduce the routing congestion by partitioning the interconnect 500 into a set of sub-fabrics based on the PD information. The partitioning can keep the demuxes intact, but build the larger muxes with 2:1 muxes. The interconnect 500 may be partitioned such that each of the sub-fabrics encompasses the subset of demux and ID compressors which are spatially close in the floorplan and the cell count for each sub-fabric is within a certain threshold for the number of demuxes, ID compressors, or a combination of both. In some examples, to contain the cell count of each sub-fabric within a certain threshold, some or all the sub-fabrics can be hierarchically partitioned into smaller secondary peripheral sub-fabrics and a secondary glue sub-fabric to bring the cell count of each partition within the threshold. In various examples, the partitioning can be determined by the chip designer/architect or using automated methods based on the placement of the on-chip components, system specification, and other suitable criteria. This is further explained with reference to FIG. 6.

Figure 6:
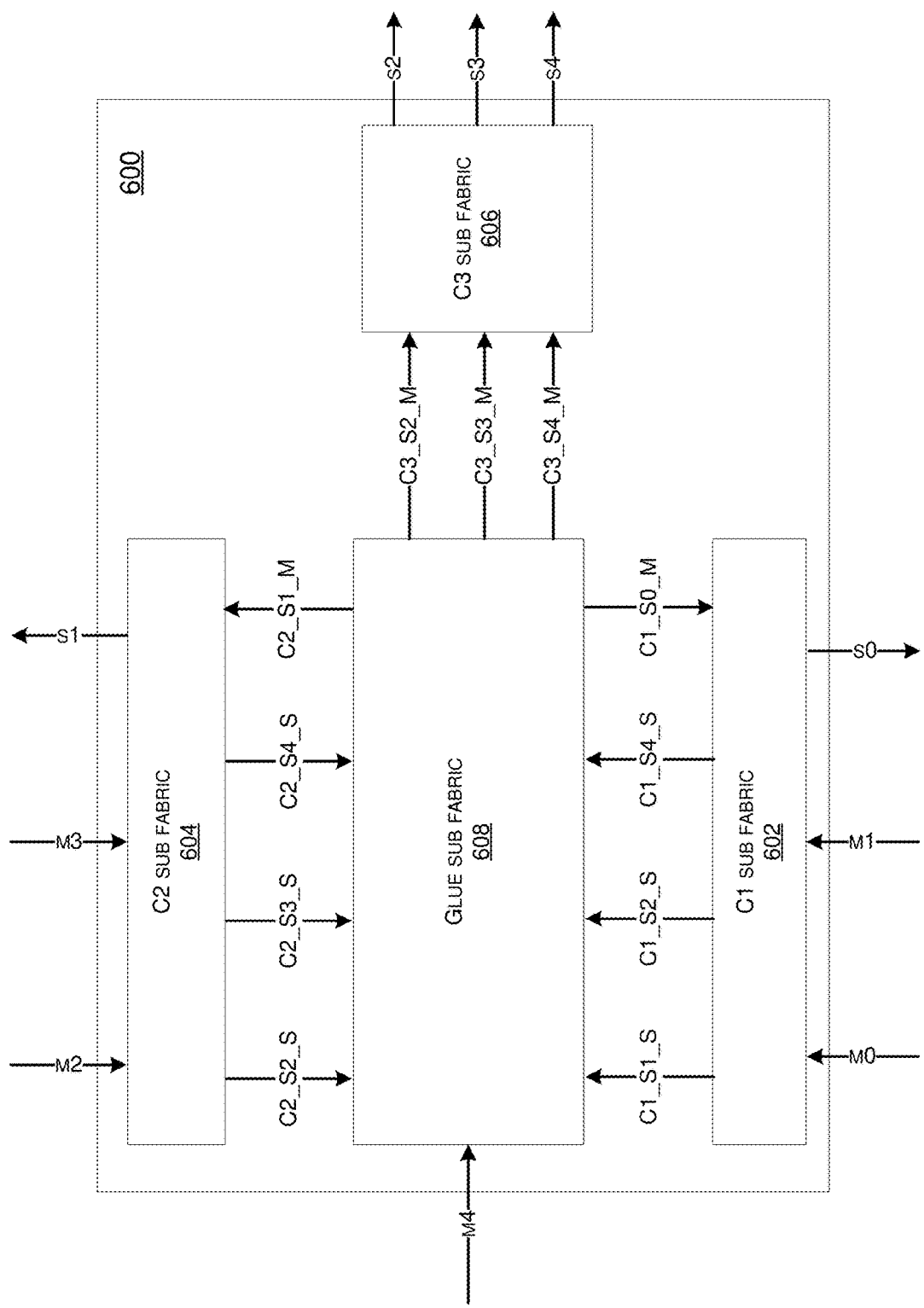
FIG. 6 shows a high-level block diagram of an interconnect that has been partitioned into a set of sub-fabrics, according to some embodiments.

FIG. 6 shows a high-level block diagram of the interconnect 600 that has been partitioned into a set of sub-fabrics, according to some embodiments. The interconnect 600 can be an example of the interconnect 500.

The interconnect 600 can be partitioned into a set of sub-fabrics comprising a C1 sub-fabric 602, a C2 sub-fabric 604, a C3 sub-fabric 606, and a glue sub-fabric 608 based on the PD information obtained for the interconnect 600. Each of the C1 sub-fabric 602, the C2 sub-fabric 604, and the C3 sub-fabric 606 may be coupled between one or more on-chip components of the IC device via one or more of the communication ports of the on-chip components. The glue sub-fabric 608 may be coupled to each of the C1 sub-fabric 602, the C2 sub-fabric 604, and the $C_3$ sub-fabric 606. For example, each of the C1 sub-fabric 602, the C2 sub-fabric 604, and the $C_3$ sub-fabric 606 may also be coupled to one or more intermediate communication ports including an intermediate initiator port or an intermediate target port that connects to the glue sub-fabric 608.

The partitioning into the sub-fabrics can be performed based on the proximity of the communication ports in the floorplan. For example, the initiators $m_0$ and $m_1$, and the target $s_0$ are in close proximity with each other, and thus these communication ports are grouped into the C1 sub-fabric 602; the initiators $m_2$ and $m_3$, and the target $s_1$ are in close proximity with each other, and thus these communication ports are grouped into the C2 sub-fabric 604; and the targets $s_2$, $s_3$, and $s_4$ are in close proximity with each other, and thus these communication ports are grouped into the C3 sub-fabric 606. Remaining communication ports such as the initiator $m_4$ can be grouped into the glue sub-fabric 608.

A connectivity matrix 700A for the C1 sub-fabric 602 is shown in FIG. 7A. The fabric connectivity matrix 700A shows input ports of the C1 sub-fabric 602 on the y-axis and the output ports of the C1 sub-fabric 602 on the x-axis. The input ports of the C1 sub-fabric 602 are coupled to the initiator port $m_0$, the initiator port $m_1$, and an intermediate communication port c1_s0_m. The output ports of the C1 sub-fabric 602 are coupled to the target port $s_0$, and intermediate communication ports c1_s1_s, c1_s2_s, and c1_s4_s. As shown in FIG. 7A, connectivity between an input port and an output port of the C1 sub-fabric 602 is indicated by a "1" in the fabric connectivity matrix 700A.

Given that the initiator port $m_0$, the initiator port $m_1$, and the target port $s_0$ are grouped together in the C1 sub-fabric 602 (e.g., based on the proximity of these ports), construction of the fabric connectivity matrix 700A can be performed as follows. For the set of initiator ports included in the sub-fabric, determine the number of unique target ports that the set of initiator ports communicate with but are not included in the sub-fabric. For example, referring to the connectivity matrix 400 in FIG. 4, the initiator ports $m_0$ and $m_1$ communicate with the target ports $s_0$, $s_1$, $s_2$ and $s_4$. The target port $s_0$ is already part of the C1 sub-fabric 602, $s_0$ there are three target ports ($s_1$, $s_2$ and $s_4$) that the initiators ports $m_0$ and $m_1$ communicate with, which are not part of the C1 sub-fabric 602. As such, three intermediate communication ports c1_s1_s, c1_s2_s, and c1_s4_s are included in the output ports of the C1 sub-fabric 602 on the x-axis in the connectivity matrix 700A to represent these three target ports, and the connectivity with the initiator ports are indicated by a "1" in the corresponding cell.

Next, for each target port that is included in the sub-fabric, an intermediate communication port is included as an input port of the sub-fabric to provide connectivity to the target port for the initiator ports that are not part of the sub-fabric. For example, referring to the connectivity matrix 700A, the C1 sub-fabric 602 has one target port $s_0$. Hence, one intermediate communication port c1_s0_m is included in the input ports of the C1 sub-fabric 602 on the y-axis in the connectivity matrix 700A to provide connectivity to the target port $s_0$. This is indicated by a "1" in the corresponding cell for the intermediate communication port c1_s0_m to the target port $s_0$.

A fabric connectivity matrix 700B for the C2 sub-fabric 604 is shown in FIG. 7B. The fabric connectivity matrix 700B shows input ports of the C2 sub-fabric 604 on the y-axis and the output ports of the C2 sub-fabric 604 on the x-axis. The input ports of the C2 sub-fabric 604 are coupled to the initiator port $m_2$, the initiator port $m_3$, and an intermediate communication port c2_s1_m. The output ports of the C2 sub-fabric 604 are coupled to the target port s1, and intermediate communication ports c2_s2_s, c2_s3_s, and c2_s4_s. As shown in FIG. 7B, connectivity between an input port and an output port of the C2 sub-fabric 604 is indicated by a "1" in the fabric connectivity matrix 700B. The fabric connectivity matrix 700B for the C2 sub-fabric 604 can be constructed in a similar manner as described above.

A connectivity matrix 700C for the C3 sub-fabric 606 is shown in FIG. 7C. The fabric connectivity matrix 700C shows input ports of the C3 sub-fabric 606 on the y-axis and the output ports of the C3 sub-fabric 606 on the x-axis. The input ports of the C3 sub-fabric 606 are coupled to intermediate communication ports c3_s2_m, c3_s3_m, and c3_s4_m. The output ports of the C3 sub-fabric 606 are coupled to the target ports s2, s3, and s4. As shown in FIG. 7C, connectivity between an input port and an output port of the C3 sub-fabric 606 is indicated by a "1" in the fabric connectivity matrix 700C. The fabric connectivity matrix 700C for the C3 sub-fabric 606 can be constructed in a similar manner as described above. Given that there are no initiator ports in the C3 sub-fabric 606, the fabric connectivity matrix 700C does not need to use any intermediate communication ports as output ports. Given that there are three target ports $s_2$, $s_3$, and $s_4$ in the C3 sub-fabric 606, three intermediate communication ports c3_s2_m, c3_s3_m, and c3_s4_m are included as input ports to the C3 sub-fabric 606, and the connectivity from each intermediate communication port to the corresponding target port is indicated by a "1" in the corresponding cell.

A fabric connectivity matrix 700D for the glue sub-fabric 608 is shown in FIG. 7D. The fabric connectivity matrix 700D shows input ports of the glue sub-fabric 608 on the y-axis and the output ports of the glue sub-fabric 608 on the x-axis. The input ports of the glue sub-fabric 608 include the initiator port $m_4$, the intermediate communication ports c1_s1_s, c1_s2_s, and the c1_s4_s coupled to the C1 sub-fabric 602, and the intermediate communication ports c2_s2_s, c2_s3_s, and the c2_s4_s coupled to the C2 sub-fabric 604. The output ports of the glue sub-fabric 608 include the intermediate communication port c1_s0_m coupled to the C1 sub-fabric 602, the intermediate communication port c2_s1_m coupled to the C2 sub-fabric 604, the intermediate communication ports c3_s2_m, c3_s3_m, and c3_s4_m coupled to the C3 sub-fabric 606. As shown in FIG. 7D, connectivity between an input port and an output port of the glue sub-fabric 608 is indicated by a "1" in the fabric connectivity matrix 700D.

The fabric connectivity matrix 700D can be constructed as follows. The input ports of the glue sub-fabric 608 include the initiator ports that are part of the glue sub-fabric 608 as decided by the partitioning (e.g., initiator port $m_4$), as well as the intermediate communication ports which are outputs from the peripheral sub-fabrics (e.g., the intermediate communication ports c1_s1_s, c1_s2_s, c1_s4_s, c2_s2_s, c2_s3_s, and c2_s4_s). The output ports of the glue sub-fabric 608 include the target ports that are part of the glue sub-fabric 608 as decided by the partitioning (e.g., none in this example), as well as the intermediate communication ports which are inputs to the peripheral sub-fabrics (e.g., the intermediate communication ports c1_s0_m, c2_s1_m, c3_s2_m, c3_s3_m, and c3_s4_m). The connectivity can be determined by tracing the connections in the original connectivity matrix 400 in FIG. 4.

The embodiments can then be used to reduce routing congestion by implementing each of the sub-fabrics C1 sub-fabric 602, the C2 sub-fabric 604, the C3 sub-fabric 606, and the glue sub-fabric 608 based on the PD information associated with the sub-fabric. For each sub-fabric, input ports of the sub-fabric that send communications to multiple output ports of the sub-fabric can be identified. For each of the identified input ports, connectivity between the input port and the multiple output ports can be implemented using a 1:N demux, where N represents a total number of output ports that the identified input port communicates with. Additionally, for each sub-fabric, each output port of the sub-fabric that receives communications from multiple input ports can be identified. For each identified output port, connectivity between the output port and the multiple input ports that communicate with the identified output port can be implemented using a set of 2:1 muxes in a hierarchical multiplexing scheme based on the PD information. Each of the peripheral sub-fabrics and the glue sub-fabric can be further partitioned into smaller secondary peripheral sub-fabrics and a secondary glue sub-fabric in a hierarchical manner.

The hierarchical multiplexing scheme may be physically aware of the floor plan and the port locations of the on-chip components coupled to the sub-fabric, which can be used to optimize the distance traveled by the interconnect buses. The mux tree can be built using hierarchical or agglomerative clustering, which may be based on a distance similarity metric of the multiple input ports to determine two inputs being provided to each 2:1 mux in the set of 2:1 muxes. Generally, the agglomerative clustering uses a bottom-up approach, where each data point starts in its own cluster. These clusters are then joined greedily, by taking the two most similar clusters together and merging them into a new node until there is one final node left.

The input to the hierarchical clustering algorithm can be a finite set S together with a dissimilarity index. S can be the set of coordinates of initiator ports or the locations of the demuxes in the sub-fabric. A dissimilarity index on a set S is a map d: SxS which is reflexive and symmetric, where $d(x, x)=0$ and $d(x, y)=d(y, x)$ for all x, y∈S. The dissimilarity index can also be referred to as a linkage metric which is a distance function. An example for the distance function for physically aware fabric design can be Manhattan distance. If the set S has N elements, a dissimilarity index is given by the $^N C_2$ pairwise dissimilarities and is the input to the algorithm. The output is the stepwise dendrogram.

At initialization, each data point can form its own cluster. As an example, d(x, y) can be the dissimilarity index between two clusters x and y. When two clusters x and y are combined into a single cluster u, the original clusters x and y can be removed from the set, and u can be added. At each iteration, the distance matrix can be updated to reflect the distance of the newly formed cluster u with the remaining clusters in the set. As an example, there can be |u| original observations u[0], u[1], ..., u[|u|−1] in the cluster u and |v| original objects v[0], v[1], ..., v[|v|−1] in cluster v, and v can be any remaining cluster in the forest that is not u.

The methods for calculating the distance between the newly formed cluster u and each v can include any suitable linkage method such as single, average, median, or centroid. The single linkage method may be based on the nearest point algorithm, and may include assigning d(u,v)=min (dist(u[i], v[j])) for all points i in cluster u and j in cluster v. The average linkage method may include assigning $$d(u, v) = \sum_{i,j}^{|u|,|v|} \frac{d(u[i], v[j])}{|u| * |v|}$$

for all points i and j where |u| and |v| are the cardinalities of clusters u and v, respectively.

Using the single linkage method can allow placing a 2:1 mux connecting the two clusters closer to, or in the direction of the next hierarchical level cluster connected to the output of the 2:1 mux. Thus, the hierarchical multiplexing scheme along with the optimal 2:1 mux placement can produce a hierarchical mux with total wire length that is relatively shorter, which can play a crucial role in reducing routing congestion. This is further described with reference to FIG. 8.

Figure 8:
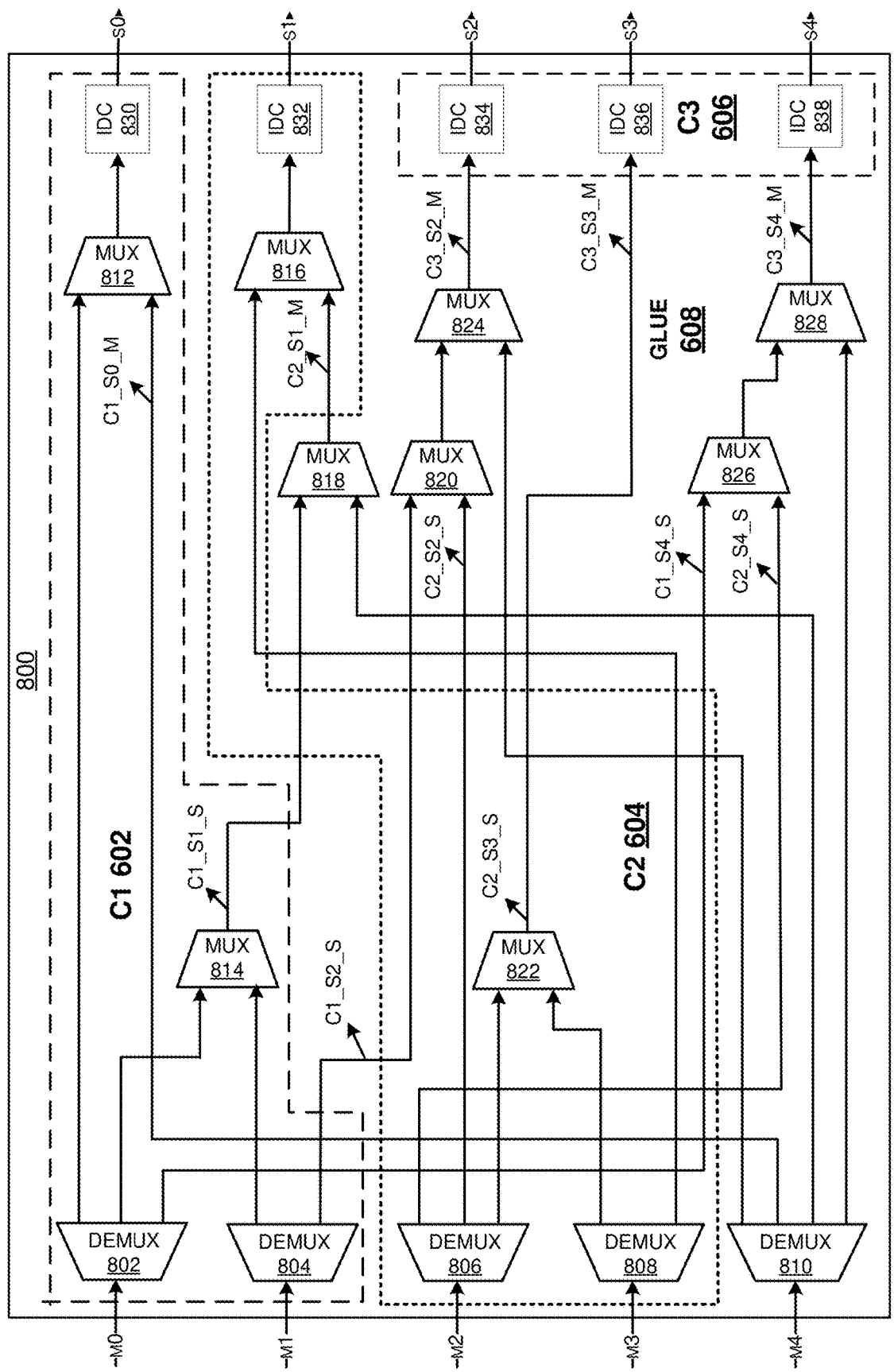
FIG. 8 shows an interconnect that has been implemented using the hierarchical multiplexing scheme, according to some embodiments.

FIG. 8 shows an interconnect 800 that has been implemented using the hierarchical multiplexing scheme, according to some embodiments. The interconnect 800 may communicate with the initiators $m_0$, $m_1$, $m_2$, $m_3$, and $m_4$ via respective input ports, and with the targets $s_0$, $s_1$, $s_2$, $s_3$, and $s_4$ via respective output ports, similar to the interconnects 500 and 600 in FIGS. 5 and 6.

FIG. 8 shows the partitioning of the interconnect 800 into the peripheral sub-fabrics C1 sub-fabric 602, the C2 sub-fabric 604, the C3 sub-fabric 606, and the glue sub-fabric 608. Each of the C1 sub-fabric 602, the C2 sub-fabric 604, the C3 sub-fabric 606, and the glue sub-fabric 608 may include one or more mux trees that have been built with 2:1 muxes using hierarchical or agglomerative clustering methods based on the PD information, as described previously. Note that in the example of FIG. 8, each of the C1 sub-fabric 602, the C2 sub-fabric 604, the C3 sub-fabric 606 is represented by the corresponding dotted boxes, and the glue sub-fabric 608 represents the remaining portion of the interconnect 800 that is not part of any of the peripheral sub-fabrics. Note that each of the C1 sub-fabric 602, the C2 sub-fabric 604, the C3 sub-fabric 606, and the glue sub-fabric 608 may include other fabric components such as register slices similar to the reg slice 202, which are not shown in FIG. 8 for ease of illustration.

As shown in FIG. 8, the C1 sub-fabric 602 may encompass a demux 802 associated with the initiator port $m_0$, a demux 804 associated with the initiator port $m_1$, and an IDC 830 associated with the target port $s_0$. The demux 802, the demux 804, and the IDC 830 may be similar to the demux 502, the demux 504, the IDC 522, respectively, in FIG. 5. Similarly, the C2 sub-fabric 604 may encompass a demux 806 associated with the initiator port $m_2$, a demux 808 associated with the initiator port $m_3$, and an IDC 832 associated with the target port $s_1$. The demux 806 and the demux 808 may be similar to the demux 506 and the demux 508, respectively, in FIG. 5. The C3 sub-fabric 606 may encompass an IDC 834, an IDC 836, and an IDC 838 associated with the target port $s_2$, the target port $s_3$, and the target port $s_4$, respectively.

The C1 sub-fabric 602 may include a mux 812 that receives communication from the initiator port $m_0$ and the intermediate communication port c1_s0_m, which is a feed-through connection via the glue sub-fabric 608 from the initiator port $m_4$ interface. The mux 812 may be similar to the mux 512 in FIG. 5, and may be coupled to the IDC 830.

In some examples, the muxes 514, 516, and 520 in FIG. 5 that receive communication from more than 2 initiator ports can be built using hierarchical mux trees as shown in FIG. 8. For example, the mux 514 that receives communication from the initiator port $m_0$, $m_1$, $m_3$, and $m_4$ can be built using a set of 2:1 hierarchical muxes comprising a mux 814, a mux 818, and a mux 816, to reduce the number of wires traversing through the interconnect to reach the target port $s_1$. The mux 814 provides connectivity between the intermediate output port c1_s1_s and the input ports respectively coupled to the initiator ports $m_0$ and $m_1$. The mux 818 provides connectivity between the intermediate output port c2_s1_m and the input ports coupled to the intermediate output port c1_s1_s of the C1 sub-fabric 602, and the initiator port $m_4$. The mux 816 provides connectivity between the target port $s_0$ via the IDC 832 and the input ports coupled to the intermediate output port c2_s1_m of the glue sub-fabric 608 and the initiator port $m_3$. Note that the hierarchical mux 814, the mux 818, and the mux 816 are parts of different sub-fabrics due to partitioning of the sub-fabrics based on the physical locations of the initiator ports $m_0$ and $m_1$, and the target port $s_1$.

Similarly, the mux 516 in FIG. 5 that receives communication from the initiator port, $m_1$, $m_2$, and $m_4$ can be built using a set of 2:1 hierarchical muxes comprising a mux 820, and a mux 824 in the glue sub-fabric 608, to reduce the number of wires traversing through the interconnect to reach the target port $s_2$. The mux 820 provides connectivity between a first input of the mux 824 and the input ports coupled to the intermediate output port c1_s2_s of the C1 sub-fabric 602 and the intermediate output port c2_s2_s of the C2 sub-fabric 604. The intermediate output port c1_s2_s of the C1 sub-fabric 602 is coupled to the initiator port $m_1$, and the intermediate output port c2_s2_s of the C2 sub-fabric 604 is coupled to the initiator port $m_2$. The mux 824 provides connectivity between the intermediate output port c3_s2_m coupled to the C3 sub-fabric 606, and the input ports coupled to the mux 820 and the initiator port $m_4$. The C3 sub-fabric 606 provides connectivity between the intermediate input port c3_s2_m and the target port $s_2$ via the IDC 834.

The C2 sub-fabric 604 may also include a mux 822 that provides connectivity between the intermediate output port c2_s3_s and the input ports respectively coupled to the initiator ports $m_2$ and $m_3$. The intermediate output port c2_s3_s of the C2 sub-fabric 604 is coupled to the intermediate input port c3_s3_m of the C3 sub-fabric 606 via the glue sub-fabric 608. The C3 sub-fabric 606 provides connectivity between the intermediate input port c3_s3_m and the target port $s_3$ via the IDC 836. In some implementations, the mux 822 may be placed closer to the initiator port $m_2$ and the initiator port $m_3$ to reduce the number of wires traversing through the interconnect to reach the target port $s_3$.

Similarly, the mux 520 in FIG. 5 that receives communication from the initiator port $m_0$, $m_2$, and $m_4$ can be built using a set of 2:1 hierarchical muxes comprising a mux 826, and a mux 828 in the glue sub-fabric 608 to reduce the number of wires traversing through the interconnect to reach the target port $s_4$. The mux 826 provides connectivity between a first input of the mux 828 and the input ports coupled to the intermediate output port c1_s4_s of the C1 sub-fabric 602 and the intermediate output port c2_s4_s of the C2 sub-fabric 604. The intermediate output port c1_s4_s of the C1 sub-fabric 602 is coupled to the initiator port $m_0$, and the intermediate output port c2_s4_s of the C2 sub-fabric 604 is coupled to the initiator port $m_2$. The mux 828 provides connectivity between the intermediate output port c3_s4_m coupled to the C3 sub-fabric 606, and the input ports coupled to the mux 826 and the initiator port $m_4$. The C3 sub-fabric 606 provides connectivity between the intermediate input port c3_s4_m and the target port $s_4$ via the IDC 838.

In some embodiments, the single linkage method can be used to place a 2:1 mux connecting the two clusters closer to, or in the direction of the next hierarchical level cluster connected to the output of the 2:1 mux. For example, placement of the muxes 814, 816, and 818, the muxes 820 and 824, and the muxes 826 and 828 can be controlled to reduce the number of wires traversing through the interconnect to reach the corresponding target port. Since each 2:1 mux may only append a single ID bit, a single ID compressor can be used at the end of the last hierarchical 2:1 mux instead of having an ID compressor for each of the 2:1 muxes. Thus, the hierarchical multiplexing scheme along with the optimal 2:1 mux placement can produce a hierarchical mux with total wire length that is relatively shorter, which can play a crucial role in reducing routing congestion. Furthermore, number of register slices throughout the interconnect may be reduced with the reduction in the number of wires traversing through the interconnect, which can reduce the overall cell count.

In some embodiments, a hierarchical mux for each target port in a given interconnect can be built using a dendrogram generated from the agglomerative clustering method. For example, a dendrogram can be generated for each target port in each of the sub fabrics, C1 sub-fabric 602, the C2 sub-fabric 604, the C3 sub-fabric 606, and the glue sub-fabric 608. This is further explained with reference to FIGS. 9A and 9B.

Figure 9B:
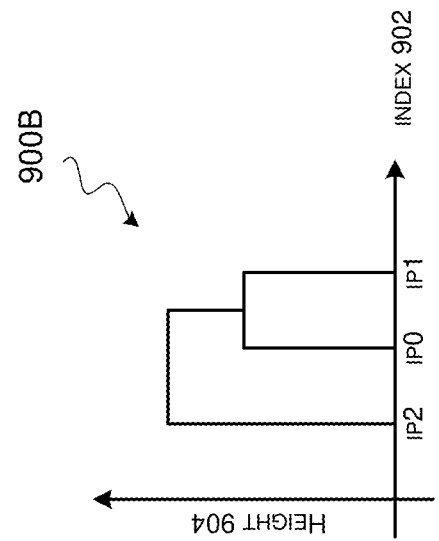
FIG. 9B shows an example dendrogram for the clustering.
Figure 9A:
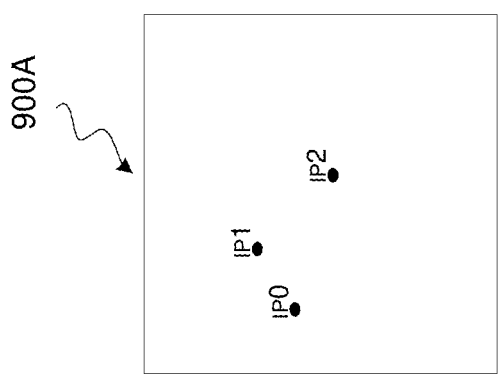
FIG. 9A shows example clustering for a set of input ports coupled to an output port in an interconnect.

FIG. 9A shows example clustering 900A for a set of input ports coupled to an output port in an interconnect. As an example, the interconnect can be the glue sub-fabric 608.

The set of input ports may include input ports ip0, ip1, and ip2 that are coupled to an output port op1. For example, the input ports ip0, ip1, and ip2 may correspond to the intermediate input port c1_s4_s, the intermediate input port c2_s4_s, and the initiator port $m_4$, and the outport port op1 may correspond to the intermediate output port c3_s4_m. The clustering 900A may represent a set S={ip0, ip1, ip2} including the set of locations of the input ports ip0, ip1 and ip2 associated with the output port op1. In some embodiments, a hierarchical mux for the outport port op1 can be built using a dendrogram generated from the agglomerative clustering method, as shown in FIG. 9B.

FIG. 9B shows an example dendrogram 900B for the clustering 900A.

In some implementations, a hierarchical clustering algorithm based on a single linkage method can be used to generate a dendrogram 900B with a height 904 using an index 902. The index 902 may correspond to the dissimilarity index between each input port ip0, ip1 and ip2. For example, the output of the agglomerative clustering for the output port op1 can be the dendrogram used to build a hierarchical mux represented as below:

$$\text{dendrogram}(op1) = mux2\{ip2, mux1\{ip0, ip1\}\}$$

Figure 10A:
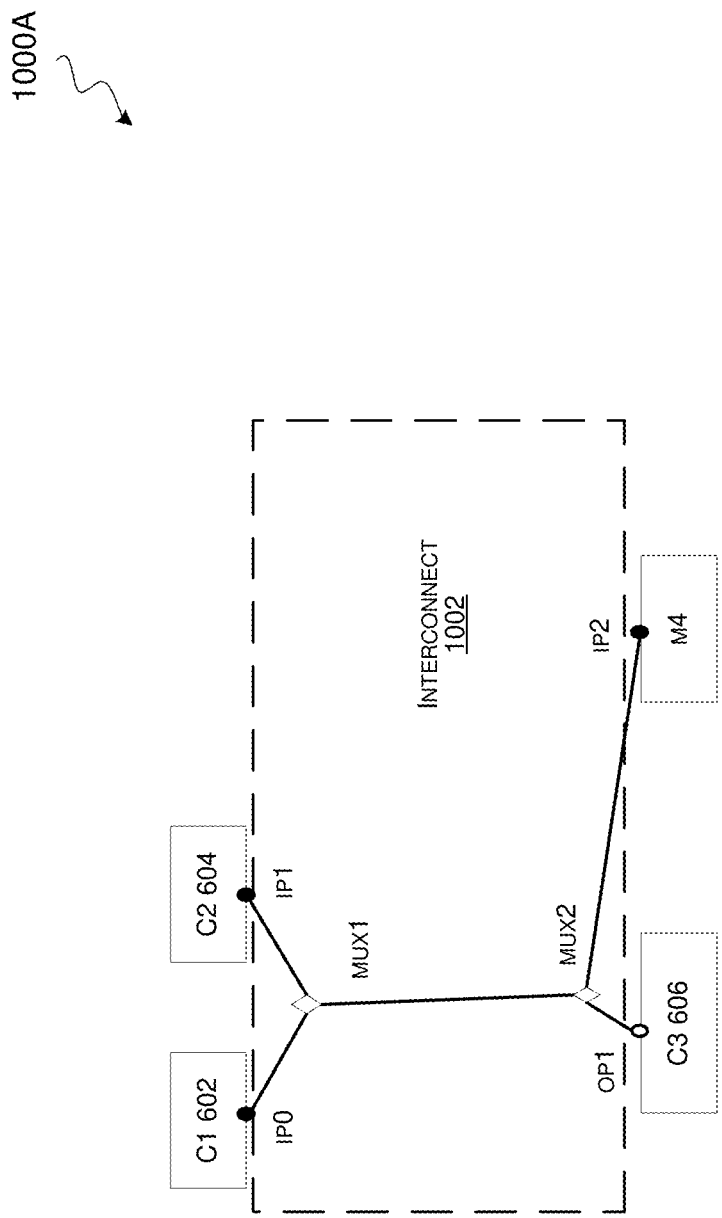
FIG. 10A shows example placement of a hierarchical mux for an output port in the interconnect, according to some embodiments.

FIG. 10A shows example placement 1000A of a hierarchical mux for an output port in an interconnect 1002, according to some embodiments. As an example, the interconnect 1002 can be the glue sub-fabric 608, which is coupled to the C1 sub-fabric 602, the C2 sub-fabric 604, the C3 sub-fabric 606, and the initiator port $m_4$.

As shown in FIG. 10A, a mux1 provides connectivity between the input ports ip0 and ip1 with a mux2. The mux2 can connect output of the mux1 and the input port ip2 to the output port op1. Referring back to FIG. 8, the mux1 can be the mux 826 with the intermediate input port c1_s4_s coupled to the C1 sub-fabric 602, and the intermediate input port c2_s4_s coupled to the C2 sub-fabric 604. The mux2 can be the mux 828 that connects the output of the mux 826 and the initiator port $m_4$ to the intermediate output port c3_s4_m coupled to the C3 sub-fabric 606. Similarly, a hierarchical mux for each output port in the glue sub-fabric 608 can be built using a dendrogram generated from the agglomerative clustering method using the set of locations of the corresponding input ports.

In some implementations, the total number of AXI ID bits appended may be dictated by the height of the dendrogram. If the height of the dendrogram is smaller or equal to a certain value 'H' limited by the ID compressor timing closure or the 2:1 mux, only a single AXI ID compressor may suffice and can be instantiated at the root of the tree (target port) to compress the AXI ID width to that of the respective target port. If an intermediate node in the dendrogram has height greater than 'H', an additional ID compressor may need to be instantiated at this node. The single method may be more suitable for smaller hierarchical mux (~10×1) since only a single ID compressor may need to be instantiated at the tree root. However, in some cases, when the single linkage method is used for a larger mux, more than one ID compressors may be needed to build the mux if the dendrogram has greater height, which may increase area and power. In such cases, other linkage methods such as average or centroid can be used to build shorter trees for the large mux which may require fewer ID compressors. Thus, the resulting routing congestion can be a trade-off between the number of muxes, ID compressors and the total wire length. The interconnect can be designed using register transfer language (RTL).

Figure 10B:
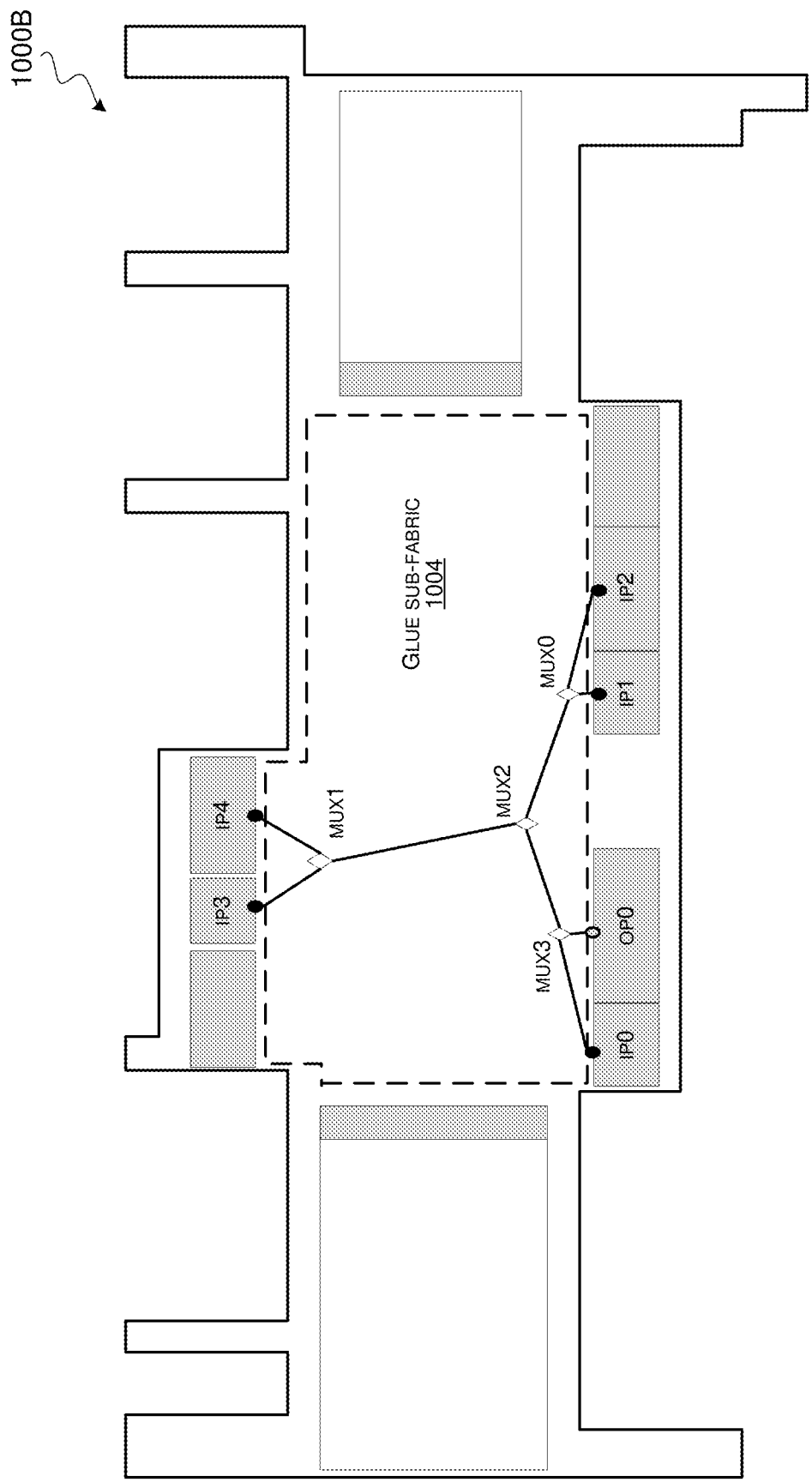
FIG. 10B shows placement of an example hierarchical mux in a glue sub-fabric in an IC device with a higher cell count, according to some embodiments.

FIG. 10B shows placement 1000B of an example hierarchical mux in a glue sub-fabric 1004 in an IC device with a higher cell count, according to some embodiments.

As shown in FIG. 10B, the glue sub-fabric 1004 may be coupled to 10 peripheral sub-fabrics represented by the shaded areas around the glue-sub-fabric 1004. The peripheral sub-fabrics may be coupled to different components of the IC device via different input ports and output ports. The example hierarchical mux in the glue sub-fabric 1004 includes a mux0, a mux1, a mux2, and a mux3. The mux0 provides connectivity between input ports ip1 and ip2 with a mux2. A mux1 provides connectivity between input ports ip3 and ip4 with the mux2. The mux2 provides connectivity between the outputs of the mux0 and mux1 with the mux3, which provides connectivity between the output of mux2 and an input port ip0 with an output port op0. As shown in FIG. 10B, the mux0 can be placed closer to the input ports ip1 and ip2, and the mux1 can be placed closer to the input ports ip3 and ip4. Similarly, the mux3 can be placed closer to the output port op0.

As described previously, the hierarchical mux in FIG. 10B can also be built using a dendrogram generated from the agglomerative clustering method using the set of locations of the corresponding input ports. An example dendrogram for the hierarchical mux can be described as below:

dendrogram($op0$)=$mux3\{ip0, mux2\{mux1\{ip3,ip4\}, mux0\{ip1,ip2\}\}\}$

FIG. 11 shows an example flowchart 1100 for a method that can be executed to implement an interconnect in an IC device using PD information, according to some embodiments. The IC device can be an SoC comprising a plurality of on-chip components, as described with reference to FIG. 1. The interconnect can be the interconnect 400, or any of the sub fabrics C1 sub-fabric 602, the C2 sub-fabric 604, the C3 sub-fabric 606, or the glue sub-fabric 608.

In step 1102, the method includes obtaining physical design information associated with the interconnect in the IC device. The interconnect can have a plurality of input ports coupled to a plurality of output ports. For example, the interconnect can be the glue sub-fabric 608 that provides connectivity between the input ports $m_4$, c1_s1_s, c1_s2_s, c1_s4_s, c2_s2_s, c2_s3_s, and the c2_s4_s, and the output ports c1_s0_m, c2_s1_m, c3_s2_m, c3_s3_m, and the c3_s4_m.

In step 1104, the method includes identifying an input port that communicates with N number of output ports. For example, as indicated by the connectivity matrix 700D for the glue sub-fabric 608, the input port $m_4$ can be identified that communicates with 4 output ports c1_s0_m, c2_s1_m, c3_s2_m, and c3_s4_m.

In step 1106, the method includes implementing connectivity between the identified input port and the N number of output ports using a 1:N de-multiplexer. As shown in FIG. 8, the 1:4 demux 810 can be used to implement connectivity between the identified input port $m_4$ and the 4 output ports c1_s0_m, c2_s1_m, c3_s2_m, and c3_s4_m.

In step 1108, the method includes identifying an output port that multiple input ports communicate with. As indicated by the connectivity matrix 700D for the glue sub-fabric 608, the output port c3_s4_m can be identified that communicates with 3 input ports $m_4$, c1_s4_s, and the c2_s4_s.

In step 1110, the method includes implementing connectivity between the identified output port and the multiple input ports using a set of 2:1 multiplexers in a hierarchical multiplexing scheme based on the PD information. As described with reference to FIGS. 9A, 9B, and 10A, a hierarchical mux for the output port c3_s4_m comprising the mux 826 and the mux 828 can be built using a dendrogram generated from the agglomerative clustering method. Note that steps 1108 and 1110 can be repeated to generate a dendrogram corresponding to each output port of the glue sub-fabric 608.

Note that the method described above with reference to the steps 1102-1110 can be used for any of the sub-fabrics of the interconnect 800, e.g., the C1 sub-fabric 602, the C2 sub-fabric 604, or C3 sub-fabric 606, that have been partitioned according to spatial proximity of the communication ports of the on-chip components of the IC device. The above method can also be used for any of the smaller secondary sub-fabrics of a sub-fabric that have been partitioned according to spatial proximity of the communication ports of the sub-fabric.

In some embodiments, the above-described method can be performed by a software program that can be executed by one or more processors of a computing system. For example, the software program can include instructions stored in a non-transitory computer readable medium that can be executed by the processor(s). The software program can be implemented using any suitable programming language, e.g., Python, $C^{++}$, Java, etc. In some embodiments, the software program can be part of an electronic design automation (EDA) tool, or a place-and-route tool.

The techniques described herein can be used to reduce routing congestion in an IC device using a backend driven design approach. Having a physically aware frontend design can allow the IC design to be PD optimized without going through multiple iterations of design, PD, re-design, re-PD etc., which can be time consuming especially with large designs with tens of millions of cells. The implementation techniques described herein can be extended to various floorplan shapes, interconnect protocols, process nodes, design frequencies, as well as crossbar implementations permitted by the floorplan size.

Figure 12:
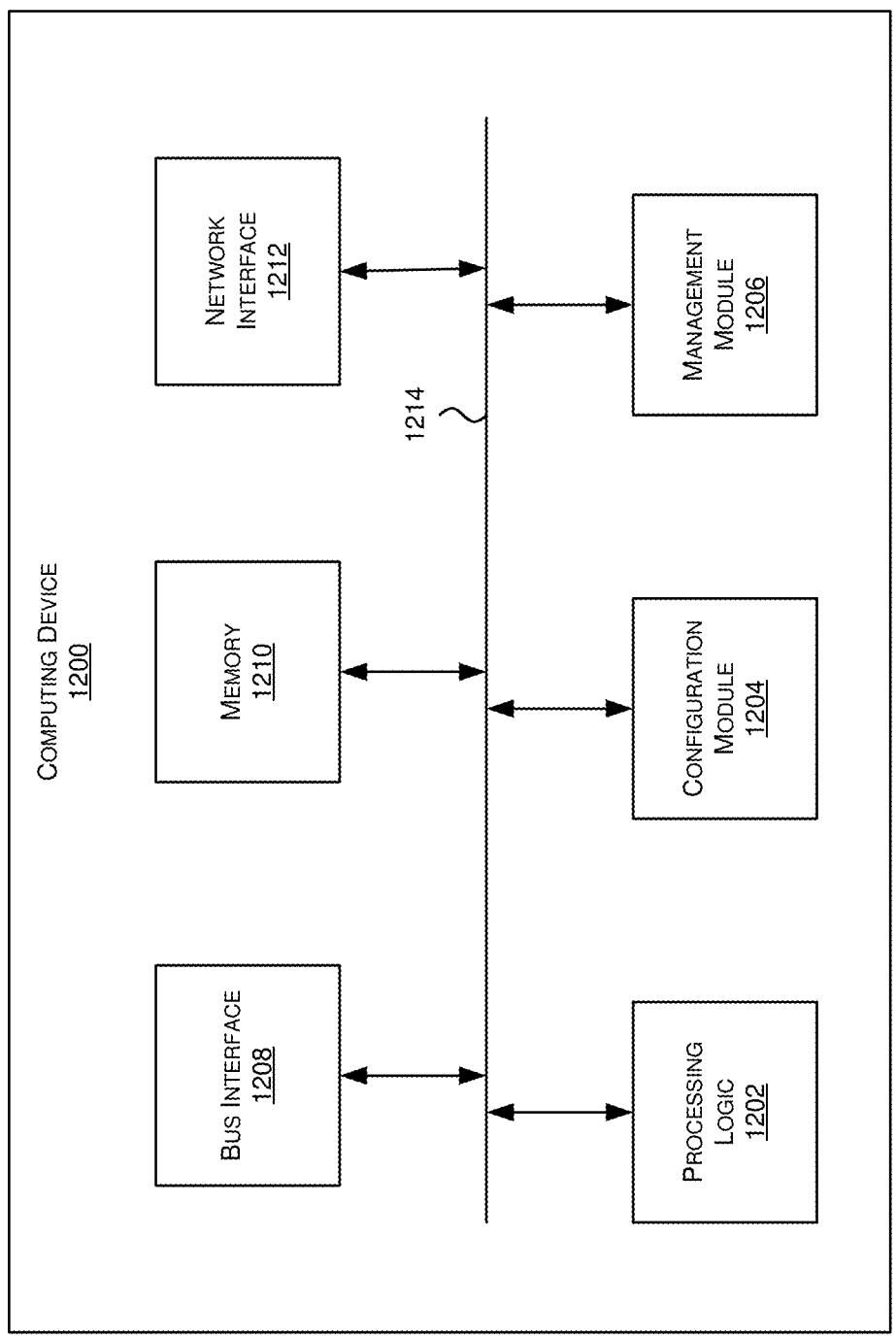
FIG. 12 illustrates an example of a computing device, according to certain aspects of the disclosure.

FIG. 12 illustrates an example of a computing device 1200. Functionality and/or several components of the computing device 1200 may be used without limitation with other embodiments disclosed elsewhere in this disclosure, without limitations. For example, the computing device can be an example of the IC device or the SoC described with reference to the previous figures. A computing device 1200 may facilitate processing of packets and/or forwarding of packets from the computing device 1200 to another device. As referred to herein, a "packet" or "network packet" may refer to a variable or fixed unit of data. In some instances, a packet may include a packet header and a packet payload. The packet header may include information associated with the packet, such as the source, destination, quality of service parameters, length, protocol, routing labels, error correction information, etc. In certain implementations, one packet header may indicate information associated with a series of packets, such as a burst transaction. In some implementations, the computing device 1200 may be the recipient and/or generator of packets. In some implementations, the computing device 1200 may modify the contents of the packet before forwarding the packet to another device. The computing device 1200 may be a peripheral device coupled to another computer device, a switch, a router or any other suitable device enabled for receiving and forwarding packets.

In one example, the computing device 1200 may include processing logic 1202, a configuration module 1204, a management module 1206, a bus interface module 1208, memory 1210, and a network interface module 1212. These modules may be hardware modules, software modules, or a combination of hardware and software. In certain instances, modules may be interchangeably used with components or engines, without deviating from the scope of the disclosure. The computing device 1200 may include additional modules, which are not illustrated here. In some implementations, the computing device 1200 may include fewer modules. In some implementations, one or more of the modules may be combined into one module. One or more of the modules may be in communication with each other over a communication channel 1214. The communication channel

1214 may include one or more busses, meshes, matrices, fabrics, a combination of these communication channels, or some other suitable communication channel.

The processing logic 1202 may include application specific integrated circuits (ASICs), field programmable gate arrays (FPGAs), systems-on-chip (SoCs), network processing units (NPUs), processors configured to execute instructions or any other circuitry configured to perform logical arithmetic and floating point operations. Examples of processors that may be included in the processing logic 1202 may include processors developed by ARM®, MIPS®, AMD®, Intel®, Qualcomm®, and the like. In certain implementations, processors may include multiple processing cores, wherein each processing core may be configured to execute instructions independently of the other processing cores. Furthermore, in certain implementations, each processor or processing core may implement multiple processing threads executing instructions on the same processor or processing core, while maintaining logical separation between the multiple processing threads. Such processing threads executing on the processor or processing core may be exposed to software as separate logical processors or processing cores. In some implementations, multiple processors, processing cores or processing threads executing on the same core may share certain resources, such as for example busses, level 1 (L1) caches, and/or level 2 (L2) caches. The instructions executed by the processing logic 1202 may be stored on a computer-readable storage medium, for example, in the form of a computer program. The computer-readable storage medium may be non-transitory. In some cases, the computer-readable medium may be part of the memory 1210.

The memory 1210 may include either volatile or non-volatile, or both volatile and non-volatile types of memory. The memory 1210 may, for example, include random access memory (RAM), read only memory (ROM), Electrically Erasable Programmable Read-Only Memory (EEPROM), flash memory, and/or some other suitable storage media. In some cases, some or all of the memory 1210 may be internal to the computing device 1200, while in other cases some or all of the memory may be external to the computing device 1200. The memory 1210 may store an operating system comprising executable instructions that, when executed by the processing logic 1202, provides the execution environment for executing instructions providing networking functionality for the computing device 1200. The memory may also store and maintain several data structures and routing tables for facilitating the functionality of the computing device 1200.

In some implementations, the configuration module 1204 may include one or more configuration registers. Configuration registers may control the operations of the computing device 1200. In some implementations, one or more bits in the configuration register can represent certain capabilities of the computing device 1200. Configuration registers may be programmed by instructions executing in the processing logic 1202, and/or by an external entity, such as a host device, an operating system executing on a host device, and/or a remote device. The configuration module 1204 may further include hardware and/or software that control the operations of the computing device 1200.

In some implementations, the management module 1206 may be configured to manage different components of the computing device 1200. In some cases, the management module 1206 may configure one or more bits in one or more configuration registers at power up, to enable or disable certain capabilities of the computing device 1200. In certain implementations, the management module 1206 may use processing resources from the processing logic 1202. In other implementations, the management module 1206 may have processing logic similar to the processing logic 1202, but segmented away or implemented on a different power plane than the processing logic 1202.

The bus interface module 1208 may enable communication with external entities, such as a host device and/or other components in a computing system, over an external communication medium. The bus interface module 1208 may include a physical interface for connecting to a cable, socket, port, or other connection to the external communication medium.

The bus interface module 1208 may further include hardware and/or software to manage incoming and outgoing transactions. The bus interface module 1208 may implement a local bus protocol, such as Peripheral Component Interconnect (PCI) based protocols, Non-Volatile Memory Express (NVMe), Advanced Host Controller Interface (AHCI), Small Computer System Interface (SCSI), Serial Attached SCSI (SAS), Serial AT Attachment (SATA), Parallel ATA (PATA), some other standard bus protocol, or a proprietary bus protocol. The bus interface module 1208 may include the physical layer for any of these bus protocols, including a connector, power management, and error handling, among other things. In some implementations, the computing device 1200 may include multiple bus interface modules for communicating with multiple external entities. These multiple bus interface modules may implement the same local bus protocol, different local bus protocols, or a combination of the same and different bus protocols.

The network interface module 1212 may include hardware and/or software for communicating with a network. This network interface module 1212 may, for example, include physical connectors or physical ports for wired connection to a network, and/or antennas for wireless communication to a network. The network interface module 1212 may further include hardware and/or software configured to implement a network protocol stack. The network interface module 1212 may communicate with the network using a network protocol, such as for example TCP/IP, Infiniband, RoCE, Institute of Electrical and Electronics Engineers (IEEE) 802.12 wireless protocols, User Datagram Protocol (UDP), Asynchronous Transfer Mode (ATM), token ring, frame relay, High Level Data Link Control (HDLC), Fiber Distributed Data Interface (FDDI), and/or Point-to-Point Protocol (PPP), among others. In some implementations, the computing device 1200 may include multiple network interface modules, each configured to communicate with a different network. For example, in these implementations, the computing device 1200 may include a network interface module for communicating with a wired Ethernet network, a wireless 802.12 network, a cellular network, an Infiniband network, etc.

The various components and modules of the computing device 1200, described above, may be implemented as discrete components, as a System on a Chip (SoC), as an ASIC, as an NPU, as an FPGA, or any combination thereof. In some embodiments, the SoC or other component may be communicatively coupled to another computing system to provide various services such as traffic monitoring, traffic shaping, computing, etc. In some embodiments of the technology, the SoC or other component may include multiple subsystems.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in FIG. 12, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A method, comprising:
   obtaining floorplan information of a system-on-a-chip (SoC) including placement information of on-chip components of the SoC and an area to implement an interconnect fabric to provide connectivity between communication ports of the on-chip components of the SoC, the communication ports including initiator ports and target ports;
   partitioning the interconnect fabric into a set of sub-fabrics based on spatial proximity of the communication ports from the floorplan information, the set of sub-fabrics comprising a set of peripheral sub-fabrics, and a glue sub-fabric coupled to each of the peripheral sub-fabrics; and
   for each sub-fabric in the set of sub-fabrics:
      identifying input ports of the sub-fabric that each sends communications to multiple output ports of the sub-fabric;
      for each of the identified input ports, implementing connectivity between the input port and the multiple output ports using a 1:N de-multiplexer, N being a total number of output ports that the input port communicates with;
      identifying output ports of the sub-fabric that each receives communications from multiple input ports of the sub-fabric; and
      for each of the identified output ports, implementing connectivity between the identified output port and the multiple input ports that communicate with the identified output port using a set of 2:1 multiplexers each having two inputs and one output in a hierarchical multiplexing scheme.

2. The method of claim 1, wherein the hierarchical multiplexing scheme uses agglomerative clustering based on a distance similarity metric of the multiple input ports to determine the two inputs being provided to each 2:1 multiplexer.

3. The method of claim 1, wherein each peripheral sub-fabric includes:
   one or more of the communication ports of the on-chip components; and
   one or more intermediate communication ports including an intermediate initiator port or an intermediate target port that connects to the glue sub-fabric.

4. The method of claim 1, wherein each target port is associated with an identifier compressor circuit block.

5. A method, comprising:
   obtaining physical design information associated with an interconnect in an integrated circuit (IC) device, the interconnect having a plurality of input ports coupled to a plurality of output ports;
   identifying an input port that communicates with N number of output ports;
   implementing connectivity between the identified input port and the N number of output ports using a 1:N de-multiplexer;
   identifying an output port that multiple input ports communicate with; and implementing connectivity between the identified output port and the multiple input ports using a set of 2:1 multiplexers in a hierarchical multiplexing scheme based on the physical design information.

6. The method of claim 5, wherein the hierarchical multiplexing scheme uses agglomerative clustering based on a distance similarity metric of the multiple input ports to determine two inputs being provided to each 2:1 multiplexer in the set of 2:1 multiplexers.

7. The method of claim 6, wherein the distance similarity metric is a Manhattan distance.

8. The method of claim 5, wherein the interconnect is one of a plurality of interconnect sub-fabrics in the IC device to provide connectivity between communication ports of on-chip components of the IC device.

9. The method of claim 8, wherein the plurality of interconnect sub-fabrics are partitioned according to spatial proximity of the communication ports of the on-chip components.

10. The method of claim 9, wherein the interconnect is a peripheral sub-fabric that is coupled between one or more on-chip components and a glue sub-fabric.

11. The method of claim 9, wherein the interconnect is a glue sub-fabric that is coupled between peripheral sub-fabrics.

12. An integrated circuit (IC) device, comprising:
 a plurality of on-chip components having communication ports including initiator ports that communicate with target ports; and
 an interconnect coupled to the plurality of on-chip components to provide connectivity between the initiator ports and the target ports, the interconnect including:
  a 1:N demultiplexer to provide connectivity between an input port of the interconnect that communicates with N number of output ports of the interconnect; and
  a set of 2:1 multiplexers implementing a hierarchical multiplexing structure to provide connectivity between an output port of the interconnect and multiple input ports of the interconnect that communicate with the output port.

13. The IC device of claim 12, wherein the hierarchical multiplexing structure is derived from agglomerative clustering based on a distance similarity metric of the multiple input ports.

14. The IC device of claim 12, wherein the interconnect is a sparsely connected interconnect fabric.

15. The IC device of claim 12, wherein the interconnect is one of a plurality of interconnect sub-fabrics in the IC device to provide connectivity for the communication ports of on-chip components.

16. The IC device of claim 15, wherein the plurality of interconnect sub-fabrics are partitioned according to spatial proximity of the communication ports of the on-chip components.

17. The IC device of claim 16, wherein the interconnect is a peripheral sub-fabric that is coupled between one or more on-chip components and a glue sub-fabric.

18. The IC device of claim 16, wherein the interconnect is a glue sub-fabric that is coupled between peripheral sub-fabrics.

19. The IC device of claim 16, wherein each of the plurality of interconnect sub-fabrics is further partitioned into smaller secondary peripheral sub-fabrics and a secondary glue sub-fabric.

20. The IC device of claim 18, wherein the glue sub-fabric includes a communication port of an on-chip component acting as an input port or an output port of the glue sub-fabric.

21. The IC device of claim 12, further comprising an identifier compressor associated with each of the target ports.

22. A non-transitory computer readable medium having stored therein instructions that, when executed by one or more processors of a computing system, cause the computing system to perform a method comprising:
 obtaining physical design information associated with an interconnect in an integrated circuit (IC) device, the interconnect having a plurality of input ports coupled to a plurality of output ports;
 identifying an input port that communicates with N number of output ports;
 implementing connectivity between the identified input port and the N number of output ports using a 1:N de-multiplexer;
 identifying an output port that multiple input ports communicate with; and
 implementing connectivity between the identified output port and the multiple input ports using a set of 2:1 multiplexers in a hierarchical multiplexing scheme based on the physical design information.

* * * * *